May 7, 1963 H. M. STRONG 3,088,170
TWO-TERMINAL END CAP FOR HIGH PRESSURE, HIGH TEMPERATURE
REACTION VESSELS
Filed Aug. 2, 1961 2 Sheets-Sheet 2

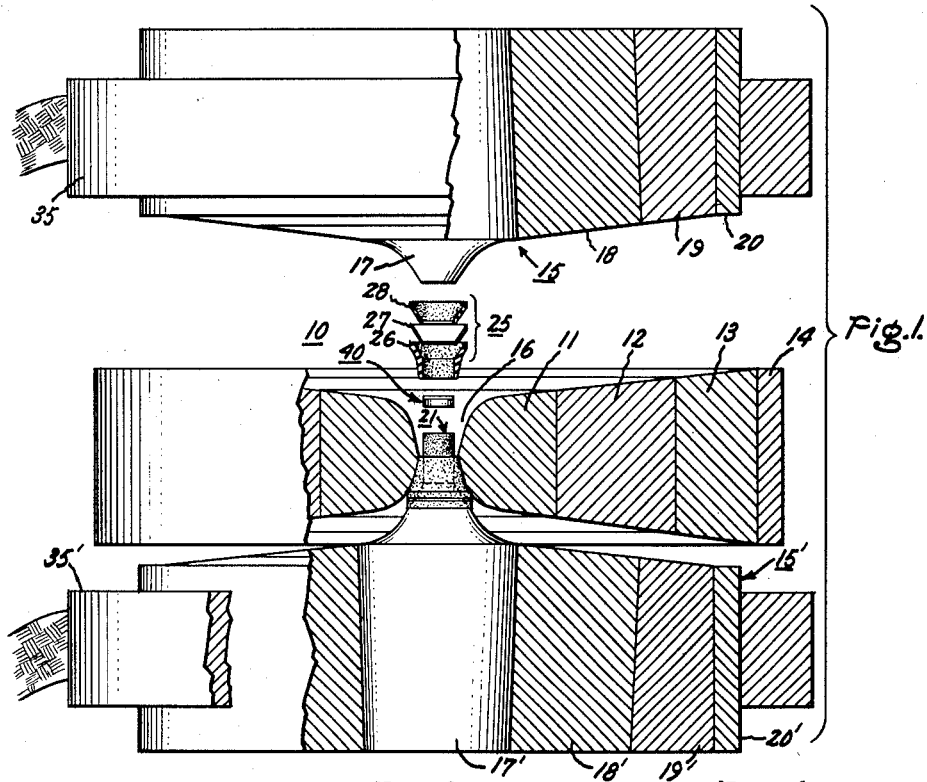

Inventor:
Herbert M. Strong,
by James J. Lichiello
His Attorney.

United States Patent Office 3,088,170
Patented May 7, 1963

3,088,170
TWO-TERMINAL END CAP FOR HIGH PRESSURE, HIGH TEMPERATURE REACTION VESSELS
Herbert M. Strong, Schenectady, N.Y., assignor to General Electric Company, a corporation of New York
Filed Aug. 2, 1961, Ser. No. 130,225
10 Claims. (Cl. 18—16.5)

This invention relates to reaction vessels of the type adapted to undergo extremely high pressures and temperatures over extended periods of time and more particularly to suitable means and arrangements in an end cap assembly therefor by which accurate measurements of conditions within the reaction vessel may be obtained. This invention is a continuation-in-part of my copending application Serial No. 810,504, Strong, filed May 1, 1959, now abandoned, and assigned to the same assignee as the present invention.

A reaction vessel may generally be described, within the scope of this invention, as a vessel or container within which there is positioned a given specimen material to be subjected to high pressure high temperature conditions, whether for the production or manufacture of a new article or for research study purposes. One such reaction vessel has been described and claimed in U.S. Patent 2,941,241, Strong, and 2,941,248, Hall, together with suitable apparatus for the application of the pressures involved. Generally, a reaction vessel of the high pressure high temperature variety is adapted to undergo considerable deformation, for example, when placed in a confining apparatus or enclosure, such as a defined belt or chamber, and then subjected to compression by suitable moving members. While such reaction vessels have been employed for numerous studies for the production of materials of different characteristics after subjection to high pressure high temperature conditions, there has been considerable difficulty in obtaining measurement means that indicate true environmental conditions within the specimen during subjection to the extreme temperatures and pressures, for example, temperatures exceeding 3,000° C. and pressures exceeding 200,000 atmospheres. Previous methods and means have been seriously hampered not only by the limited space involved, but also by the overall closure and the general unapproachability of the reaction vessel in the confining apparatus.

Accordingly, it is an object of this invention to provide an improved reaction vessel.

It is another object of this invention to provide an improved end cap for a reaction vessel.

It is still another object of this invention to provide a reaction vessel utilizing component parts of the enclosing apparatus in an electrical measuring circuit.

It is yet another object of this invention to provide a reaction vessel incorporating an electrical circuit separate from the electrical circuit providing high temperature in the reaction vessel.

It is a further object of this invention to provide a two-terminal current ring end cap assembly for reaction vessels to provide various electrical circuit connections.

Briefly described, this invention in one form contemplates the use of a plurality of interfitting, contiguous electrically conducting and electrical insulating parts within an end cap assembly to provide an electrical circuit from within the reaction vessel through an electrically conductive part of the apparatus to the exterior of the apparatus.

This invention will be better understood when taken in connection with the following description and the drawings in which:

FIG. 1 is one form of a high pressure high temperature apparatus employed to apply pressure and temperature to a reaction vessel;

FIG. 2 is a half sectional view of a prior reaction vessel within a high pressure apparatus;

FIG. 3 is an exploded view of an end cap in accordance with the teachings of this invention;

FIG. 4 is a reaction vessel employing the end caps of this invention positioned within a high pressure high temperature apparatus.

Figure 5:
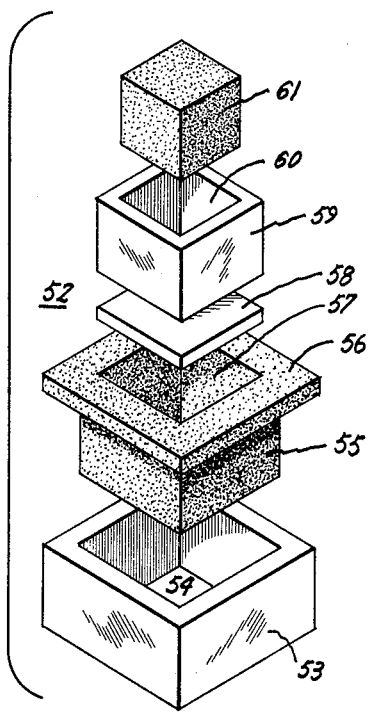
FIG. 5 is a modification of the end cap of FIG. 3.

One preferred apparatus employed to obtain high pressure high temperature conditions is illustrated in FIG. 1 by an apparatus indicated generally by numeral 10. Apparatus 10 includes an annular ring or belt 11 suitably reinforced with one or more binding or strengthening rings 12, 13 and 14. Belt 11 and rings 12, 13 and 14 are of very high strength materials. For example, the belt 11 may be made of a cemented tungsten carbide material and the rings 12 and 13 of high grade tool steel while the safety ring 14 may be of soft steel. Belt 11 together with punch assemblies 15 and 15' define a chamber 16 into which one or both of the punch assemblies 15 and 15' may progress. A punch assembly, for example assembly 15, generally comprises a tapered punch 17 which is in turn surrounded by binding rings 18 and 19, and a safety ring 20. Punch 17 is also of a high strength material such as cemented tungsten carbide or tool steel and the rings 18 and 19 of high strength tool steel with ring 20 being a safety ring in the same manner as ring 14. A reaction vessel 21 is positioned within the chamber 16 to be compressed by the punches 17 and 17'.

In order to seal the reaction vessel 21 within the volume or chamber defined by the punches 17 and 17' and belt 11, a gasket assembly 25 is employed with each punch. The gasket assembly 25 for the upper punch in FIG. 1 is shown in exploded view to facilitate a description thereof, and the description of the upper gasket assembly is the same as for the lower gasket assembly. In one form of this invention, assembly 25 comprises a pair of thermally and electrically insulating gaskets 26 and 28 and an electrically conductive gasket 27. The thermally and electrically insulating gasket assemblies serve various functions including (1) sealing in the contents of the chamber, (2) permitting a rather large movement of the punch relative to the belt, and (3) providing an electrical insulation between the belt 11 and the punches 17 and 17' when resistance heating is employed. Various stone-like or ceramic materials may be employed as gaskets 26 and 28, good results being obtained when gasket materials are pyrophyllite, catlinite, talc or other thermal and electrically insulating materials which have preferred characteristics for high pressure high temperature operation. Included among these characteristics are, the ability to undergo extensive compression without undue spalling, the ability to maintain an electrically nonconductive characteristic under high pressure high temperature conditions, and also the ability to transmit high pressures from the apparatus to the specimen in a generally hydrostatic manner. Gasket assembly 25 in one form of the invention comprises a thermally and electrically insulating pressure resistant tapered pyrophyllite gasket 26 followed by an electrically conducting tapered metal gasket 27 and an outer gasket 28 similar in material to gasket 26. The metal gasket 27 is utilized to impart a toughness and ductility to the gasket structure as a whole. In one form of this invention, a mild steel, dry hydrogen annealed to substantially maximum softness, is one preferred material for such a gasket. Outer gasket 26 tapers inwardly to conform on its exterior surface with the tapered surface of belt 11, and the gasket intself at its axial ends, provides surfaces meeting in abutting relationship with belt 11 to provide a liner or insulator for chamber 16, and reaction vessel 21.

Reaction vessel 21 is more clearly illustrated in FIG. 2 and represents a prior type reaction vessel mounted within a suitable high pressure high temperature apparatus.

As illustrated in FIG. 2, reaction vessel 21 includes a hollow thermally and electrically insulating cylinder 30 of the same material as gaskets 26 and 28. Each end of cylinder 30 has concentrically positioned thereon an end disc 31 (and 31' not shown) of electrically conductive metal. An end cap assembly 32 is positioned upon the end disc 31 and includes a hard steel electrically conductive ring 33 surrounding a disc or plug 34 of the same material as cylinder 30. By means of the ring 33 and disc 31, an electrical circuit may be provided to heat the specimen material by resistance heating where the material itself is made electrically conductive or where other electrically conductive elements may be disposed within the specimen. The electrical circuit for resistance heating is best described with relation to FIGS. 1 and 2. Referring to FIG. 1, there is shown a pair of electrical conductors 35 leading from a source of power, not shown, to punch assemblies 15 and 15'. From one of the punch assemblies, for example, upper assembly 15, electrical conductor 35 provides a current flow through the punch assembly 15 to punch 17. Now referring to FIG. 2, the current flows from punch 17 through ring 33, through disc 31 and through the specimen material for resistance heating thereof. Thereafter, current flows in the reverse order through the lower half of the reaction vessel of FIG. 2, which is the same as the top half, and through the corresponding punch assembly 15' and current conductor 35' of the apparatus of FIG. 1.

The description with relation to FIGS. 1 and 2 is not only complete for a reaction vessel and one apparatus, but also magnifies the problem of obtaining accurate measurements of the condition within the specimen which is under high temperature high pressure conditions. The use of the press apparatus or the reaction vessel parts for additional circuits would interfere with the resistance circuit utilized to heat the specimen material. It may also be understood that, for example, in order for a thermocouple wire or other electrical lead to be suitably connected to obtain accurate internal conditions, the lead must pass from the outside through both the apparatus and the reaction vessel. The practice of providing an opening in the punch or belt is not only dangerous from the standpoint of stress concentrations, but also prevents maximum pressure built up by means of a relatively unsealed opening. One previous practice is illustrated in FIG. 2 by an electrical lead 36 which passes through a carefully drilled opening 37 and into specimen 38. Among the disadvantages of this practice are the difficulties in providing precise slots or openings in the various materials, and the fact that under high pressure high temperature conditions failures occur generally in the lead 36 by the lead being pinched off under the extreme pressure generated between the punch and the belt. In other instances lead 36 may touch gasket 27 or die 11 and short circuiting results.

This invention provides a new and improved end cap assembly for reaction vessels by which electrical measurements may be obtained to determine precise conditions existing or occurring within the specimen or reaction vessel. The novel end cap assembly of the reaction vessel is utilized to provide the proper circuit connections and work in conjunction with the heretofore unused metal gasket 27. The novel end cap assembly is best illustrated in FIG. 3.

Referring now to FIG. 3, there is shown an end cap assembly 40 comprising an annular ring 41 of the same outside diameter as cylinder 30 and being of an electrically conductive hard metal, such as steel. A flanged annular member or bushing 42 has a cylindrical annular portion 43 which fits closely within the ring 41. A flange portion 44 of member 43 overlies the top surface of ring 41 and has an outside diameter similar to the outside diameter of cylinder 30. Member 42 is of the same type material as cylinder 30 and gaskets 26 and 28. An electrically conductive metallic disc 45 has an outside diameter equal to the inside diameter of the annular portion 43 and fits therein horizontally as indicated in FIG. 4. Thereafter, a further electrically conductive hard metal ring 46 whose outside diameter is similar to the inside diameter of the annular portion 43 is slidably fitted therein to rest upon the electrically conductive disc 45, the combined height of ring 46 together with disc 45 being equivalent to the height of the annular assembly 42. A nonconductive plug 47 of a material similar to the material of cylinder 30 and with an outside diameter equal to the inside diameter of the annular metal ring 46 fits therein to rest upon disc 45. The combined and total interfitting of all parts involved, present an assembled end cap 40 as illustrated in FIG. 4 in assembled relationship with cylinder 30 to present a complete reaction vessel.

Reaction vessel 21 comprising the cylinder 30 and end cap assembly 40 contains a specimen material indicated at 38. Such a reaction vessel, referring to FIG. 4, may then be employed to subject different specimens to high pressure and to high temperatures. If high temperature is a part of the process, a preferred form of heating is resistance heating and in this instance, current is conducted through the specimen, for example, as a high resistance portion of a circuit. Alternatively, specimen 38 may be made electrically conductive by the addition of electrically conductive elements or materials, or in one form, heated by means of passing a current through a suitable resistance heater. Referring now to FIG. 4, a preferred electrical circuit for measuring or indicating the true conditions within sample 38 is illustrated by an electrical lead 48 which passes through the central part of reaction vessel 21 within specimen 38. Lead 48 extends laterally outwardly from the specimen, through the cylinder 30 and extends upwardly in a groove provided axially in the exterior wall surface of cylinder 30 to be embedded under and make contact with ring 41. Lead 48 also extends laterally from specimen 38 and then vertically downwardly to make contact with ring 41 at the bottom of the reaction vessel in a similar manner as the circuit described for the upper part of the reaction vessel. Outside connections to this circuit are obtained by means of leads 49 and 49' which are connected to the metal tapered gasket 27. Gasket 27 which was previously unused for this sort of electrical connection, and which was or is, by assembly, connected into the resistance heating circuit of the reaction vessel 21, is now employed as the external connection for the measuring circuit, thereby eliminating passing of wires through the gaskets 26 and 28 where pinch-off conditions have resulted in failure. Lead 48 passing through the center of the specimen may be a thermocouple element, i.e., a platinum wire extending from one side of a juncture 50 and a platinum rhodium wire extending from the other side of juncture 50 for temperature measurements. Where the wire is to be protected from the sample material because of the high pressure or reactions occurring, it may be suitably insulated by an insulating tube 51. Such a wire lead 48 passing through reaction vessel 21 may also be a barium wire and the measured change in electrical resistance will indicate the pressures involved.

Numerous circuits may be devised and adapted for such a reaction vessel when a two-current ring is so supplied and the circuit indicated is merely one example. A further circuit may be established by a suitable electrical connection to die 11 and from die 11 to the interior of the reaction vessel. It is also understood that the heating circuit may be established through gaskets 27 and 27', rings 41 and 41', and the respective leads 48, 49 and 49' while the measuring circuit includes punches 17 and 17', rings 46 and 46' and discs 45 and 45' etc.

The various materials for the electrically conductive parts such as rings 41 and 46, discs 45 and gaskets 27 may be chosen from different metals to provide a desired result. For example, rings 41 and 46 may be of a thermoelectric metal such as Alumel, constantan, Chromel, platinum or platinum rhodium. Also, gasket 27 may also be made of such thermoelectric metals. The combinations or choices then may preserve thermoelectric integrity from a thermocouple junction in reaction vessel 21 to exterior recording instruments. Alternatively, pressure sensing manganin wire may be used for ring 41 and gasket 27 in order to avoid thermoelectric potentials.

Examples of metallic materials for discs 45 include nickel, titanium, tungsten, tantalum, iron, platinum etc., with many variations contemplated to provide suitable circuitry and/or to contribute to the reaction.

It may be seen that this invention provides a two-terminal end cap assembly for reaction vessel whereby a plurarlity of circiuts to indicate pressure temperature resistance etc., or the internal conditions of the specimen within the reaction vessel 21 may be utilized without interfering with the electrical resistance circuit utilized to heat the specimen. Such a two-terminal end cap also substantially eliminates the inherent danger of the leads being pinched off and short circuited due to high pressures and forces present.

In apparatus capable of attaining the magnitude of desired pressures and temperatures, care must be taken in the choice of materials, their configurations and their general proportions in order to minimize failures both electrical and mechanical. The parts must at all times be strong enough to provide the same force withstanding ability and controlled compression as prior end caps and to have the same function. The combination of parts must cooperate to preserve the same geometry under compression as previous end caps. At the same time, the dual circuitry must be maintained in dual nature under adverse conditions of pressures and temperatures of the indicated magnitude. In one form of this invention with the general proportion illustrated in the figures, one preferred end cap assembly includes the following materials and sizes:

| Part Number | Material | Size (Inches) |
|---|---|---|
| 41 | hard steel | O.D. 0.75—I.D. 0.60. |
| 44/43 | pyrophyllite | O.D. 0.75/O.D. 0.60, height .220. |
| 45 | nickel | .010–.030 x 0.55. |
| 46 | hard steel | O.D. 0.55–I.D. 0.40. |
| 46 | pyrophyllite | O.D. 0.40. |

Broadly speaking, this invention describes an end cap assembly for reaction vessels where current is passed through one circuit from a punch to the sample material and through a separate circuit into the reaction vessel. Ordinarily, these vessels utilize an electrically conductive plate or disc in contact with the sample material, so that an electrically conducting member, for example ring 46, is provided to carry current from the punch to the plate. Thereafter, a further electrically conducitve member, for example ring 41, is provided adjacent to the first electrically conductive member (ring 46) but electrically insulated from it as well as from the plate and punch. The further electrically conductive member is utilized to carry current into a different portion of the reaction vessel.

The description of this invention has heretofore been related to cylindrical reaction vessels and cylindrical or circular end caps. The end cap of this invention, however, may also be practiced with other reaction vessel configurations, for example cubes, rectangular parallelepipeds, tetrahedrons or other geometrical and/or irregular configurations. These configurations may thus require a polygon form of end cap. The particular end cap configuration illustrated, or other configurations as described may also be embedded in a suitable insulating container or reaction vessel of various configurations.

As a specific alternative embodiment and practice of this invention, a rectangular parallelepiped reaction vessel and square end cap may be employed in an apparatus such as disclosed and claimed in copending application Serial No. 855,867, Bundy, filed November 27, 1959, and assigned to the same assignee as the present invention. The Bundy apparatus comprises, for example a pair of vertical, oppositely positioned, trapezoidal punches and four equally spaced horizontal, oppositely positioned, trapezoidal punches. These punches move together to define a cube or rectangular parallelpiped reaction chamber. Three horizontal punches may define a prismatic reaction chamber. Such reaction chambers may utilize a corresponding cube, rectangular parallelepiped or prism reaction vessel with a rectangle polygon triangle etc. end cap, for example, the rectangular end cap 52 of FIG. 5.

Figure 6:
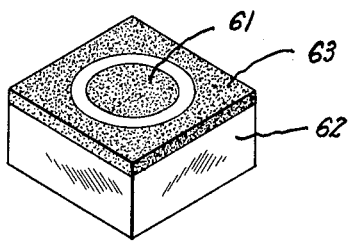
FIG. 6 is a modification of FIG. 5.

Referring now to FIG. 5, rectangular end cap 52 includes a first rectangular electrically conductive member 53 having an opening 54 therethrough. An electrical nonconductive second member 55 is positioned contiguously with opening 54 in first member 53 and includes a flange-like portion 56 which overlies first member 53. Second member 55 is provided with an opening 57 therethrough in which an electrically conductive plate member 58 is positioned. An electrically conductive third member 59 having an opening 60 therethrough is positioned within opening 57 of second member 55 and in contact with plate member 58. An electrically nonconductive plug 61 is thereafter positioned within opening 60 to complete the end cap. The first, second, and third members, 53, 55 and 59, may also be referred to as perimeter members, closed or unclosed, and the term "annular ring" as employed in the appended claims is intended to include perimeter members generally, and having openings therethrough. It is of course obvious that only the outside or first member need be a rectangle polygon etc. to conform to the reaction chamber. The inner members may be circular or of other regular and mixed configurations. As a practical matter, it is more economical to provide circular openings in a polygon member rather than a polygon opening. As an example, reference is made to FIG. 6 which illustrates a first member 62 having a peripheral polygon configuration while internal members are circular. The second electrically nonconductive member 63 has its flange portion 64 also of a polygon configuration. The flange portion in all instances in all configurations may be a part separate from the members 55, 43 and 63. All parts are generally described as flat-like or horizontal members which contiguously interfit in horizontal relationship with each other to define a generally solid configuration.

While other modifications of this invention and variation of apparatus which may be employed within the scope of the invention have not been described, the invention is intended to include all such as may be embraced within the following claims.

What I claim as new and desire to secure by Letters Patent of the United States is:

1. An improved end cap assembly for reaction vessels comprising in combination, an electrically conductive first member having an opening therein, an electrically nonconductive second member having an opening therein and positioned within said opening in said first member, a flange adjacent said second member overlying said first member, an electrically conductive plate member positioned within said opening of said second member, an electrically conductive third member having an opening therein and positioned within the said opening of said second member and in electrical contact with said plate member, and an electrically nonconductive plug positioned within said opening in said third member and on said plate so that separate electrical circuits may be made to said first member and to said third member with the said circuits insulated from each other.

2. An improved end cap assembly for reaction vessels comprising in combination, an electrically conductive first perimeter member, an electrically nonconductive second perimeter member positioned within and adjacent said first perimeter member, a flange next adjacent said second perimeter member overlying said first perimeter member, an electrically conductive plate positioned within said second perimeter member, an electrically conductive third perimeter member positioned within said second perimeter member and in electrical contact with said plate, and an electrically nonconductive plug within said third perimeter member and on said plate so that separate electrical circuits may be established with said first perimeter member and said third perimeter member with the said electrical circuits insulated from each other.

3. The invention as recited in claim 2 wherein said first perimeter member is polygonal.

4. The invention as recited in claim 2 wherein said first perimeter member is arcuate.

5. An improved end cap assembly for reaction vessels comprising in combination, an electrically conductive first ring, an electrically nonconductive second ring coaxially positioned within and adjacent said first ring, a portion of said second ring overlying said first ring, an electrically conductive disc concentrically positioned within said second ring, an electrically conductive third ring coaxially positioned within said second ring and in electrical contact with said disc, and an electrically nonconductive plug positioned concentrically within said third ring and on said disc, so that separate electrical circuits may be made to said first ring and to said third ring with the said circuits insulated from each other.

6. An improved end cap assembly including a plurality of interfitting and contiguous parts whose final assembled form represents a thick disc having substantially smooth and unbroken parallel walls, comprising in combination, an annular electrically conductive hard steel first ring, an electrically nonconductive stone second ring in the form of a flanged bushing coaxially positioned within and adjacent said first ring with the flanged portion overlying said first ring, an electrically conductive metal disc coaxially positioned within said second ring and having a thickness of less than that of said second ring, an electrically conductive hard steel third ring coaxially positioned within said second ring and in electrical contact with said disc, and an electrically nonconductive stone plug positioned concentrically within said third ring and on said disc, so that separate circuits may be established with said first ring and said third ring with the said electrical circuits insulated from each other.

7. A reaction vessel comprising in combination, a hollow cylinder of electrically nonconductive material, and an end cap assembly concentrically positioned on each end of said cylinder, each of said end cap assemblies comprising the combination of elements recited in claim 1.

8. A reaction vessel comprising in combination, a hollow stone cylinder, and an end cap concentrically positioned on each end of said cylinder, each of said end caps comprising the combination of elements recited in claim 2.

9. In a high pressure high temperature apparatus including a tapered punch and a tapered die defining a reaction chamber, and a gasket assembly between the tapered surface of the punch and the tapered surface of the die, the gasket assembly including a pair of electrically nonconductive gaskets with a metallic electrically conductive gasket therebetween and a reaction vessel in said defined chamber, said reaction vessel comprising in combination, a hollow electrically nonconductive cylinder, an end cap assembly positioned on each end of said cylinder, each of said end cap assemblies comprising, an annular electrically conductive first ring positioned concentrically within and in electrical contact with said metallic gasket, an electrically nonconductive second ring coaxially positioned within and adjacent to said first ring, a portion of said second ring overlying said first ring to electrically insulate said first ring from said punch, an electrically conductive disc coaxially positioned within said second ring and adjacent the end of said hollow cylinder, an electrically conductive third ring coaxially positioned within said second ring and in electrical contact with said disc and said punch, and an electrically nonconductive plug positioned concentrically within said third ring and adjacent said disc and said punch, so that an electrical connection may be made to said first ring and an electrical connection may be made to said third ring with the said electrical connections insulated from each other.

10. The invention as claimed in claim 9 wherein the end cap assembly includes, an annular electrically conductive hard steel first ring, an electrically nonconductive stone second ring coaxially positioned within and adjacent said first ring, a portion of said second ring overlying said first ring, an electrically conductive metal disc concentrically positioned within said second ring, an electrically conductive hard steel third ring coaxially positioned within said second ring and in electrical contact with said disc, and an electrically non-conductive stone plug positioned concentrically within said third ring and on said disc.

References Cited in the file of this patent

UNITED STATES PATENTS

| 2,995,776 | Grardini | Aug. 15, 1961 |
| 2,996,763 | Wentorf | Aug. 22, 1961 |